United States Patent
Paramest

[11] Patent Number: 5,564,226
[45] Date of Patent: Oct. 15, 1996

[54] CONVERTIBLE PLANTER SET

[76] Inventor: Sam Paramest, 17407 3rd Ave. SE., Bothell, Wash. 98012

[21] Appl. No.: 548,881

[22] Filed: Oct. 26, 1995

[51] Int. Cl.⁶ ..................................................... A01G 9/02
[52] U.S. Cl. ..................................................... 47/71; 47/66
[58] Field of Search ............................... 47/66 P, 66 D, 47/87, 71

[56] References Cited

U.S. PATENT DOCUMENTS

| | | | |
|---|---|---|---|
| 964,196 | 7/1910 | Aul | 47/71 |
| 4,151,680 | 5/1979 | Sena | 47/71 |
| 4,232,482 | 11/1980 | Watt | 47/66 P |
| 5,152,098 | 10/1992 | Hall | 47/71 |
| 5,419,080 | 5/1995 | Buss | 47/87 |
| 5,481,826 | 1/1996 | Dickinson | 47/71 |

FOREIGN PATENT DOCUMENTS

| | | | |
|---|---|---|---|
| 27024 | 3/1940 | Ind. | 47/66 P |
| 1179807 | 2/1970 | United Kingdom | 47/66 P |

Primary Examiner—Henry E. Raduazo

[57] ABSTRACT

The plant container is a hollow, taper-shaped container, which has a larger top end and a smaller bottom end. A circular bottom edge is connected to the inner side rim of the bottom end of the container. A flat, round removable bottom wall is set to rest on the bottom edge to enclose the bottom end of the container. The matching plant stand is a larger hollow, cylindrical structure. A cross wall is connected horizontally to the inner side wall of the plant stand to make a shallow tray on one end and a deep bowl on the other end. An adjustable bracing post member is connected vertically to a center of the cross wall of the bowl side. For an ordinary application, the plant container can be set on the shallow tray side of the plant stand during growing and decorating a type of plant. For an ejecting and setting means, the plant container can be rearranged to set on the bracing post of the bowl side of the plant stand. The side wall of the container can be pressed downwardly to rest on the cross wall of the bowl, so that the bottom wall and the plant and its pot bound roots can be set openly on the top of the post. The plant can be easily removed for transplanting or can be set on the top of the post for further soil treating or root caring work. In the meantime, the bowl is set constantly as a trash bin to collect dust, dirt and dead roots during removing, soil treating, or root caring work.

6 Claims, 2 Drawing Sheets

CONVERTIBLE PLANTER SET

BACKGROUND OF INVENTION

1. Field of Invention

This invention relates generally to a convertible set of a plant container and a receptacle plant stand, which can be set for growing and decorating a house plant and can be convertibly set to apply for ejecting and setting the plant for transplanting, soil treating and root caring work.

2. Discussion of Prior Art

Many types of house plants are planted to grow in the plant containers or pots. The plant container, which is placed to grow a plant inside a house, must be set on a receptacle tray for preventing water from watering to run onto a floor. The integral part of the receptacle tray can be made as a separate structure or can be made as an attachment part to be connected onto the bottom end of the container.

However, growing a certain type of plants in the limited space of the container may have major setbacks, because the plant may be overgrow to be too large. The overgrown plant should be removed from its container for transplanting into a larger container or be further separated to grow in two or more pots. Besides, the various under soil treatments and root caring work may have to be done during the lifetime of the growing cycle of the plant. For whatever reason, each plant must be removed from the plant container and set up for effective work accordingly. However, the plant may develop its think, branches and leaves to be higher and larger to cover around the top part of the container and may also develop its underground roots to form into tight pot-bound roots to stick with the container. Furthermore, the container is made with the type of fixed enclosure side wall and bottom wall. Therefore, cutting, breaking, pulling, digging or damaging some of the plants or plant containers, during the removal process, may be bound to happen. Besides, the removal task may take time and energy. The process may also shock and stop the potential growth of some plant as well.

As a result, the new invention is designed to function beyond the ordinary scope of containing, growing and decorating a type of house plant. *"The Planter Set"* can be convertibly set to apply for a smoother transaction of ejecting and setting the plant in the open space for the imminent tasks of transplanting, soil treating, and root caring work.

SUMMARY AND OBJECTS OF INVENTION

Summary of Invention

The invention comprises a set of a plant container and a matching receptacle plant stand. The plant container consist of two separated structures: a vertical, thin, enclosure side wall and a flat, horizontal, removable, bottom wall. The side wall is made to form into a hollow, taper-shaped, body structure of the container. The taper-shaped container has a larger circumference and larger opening on a top end and a smaller circumference and smaller opening on a bottom end. A circular bottom edge is connected to the bottom border of the side wall to surround the bottom opening of the container. The flat, round, removable, bottom wall is set to rest on the bottom edge to enclose the bottom end of the container. The bottom wall has a center hole opening for a connection with the plant stand. There are several water drainage holes which are made on the side wall just above the bottom edge. The two major structures of the plant container can be made of a plastic material through a molding production process.

The plant stand body is a hollow, drum type, cylindrical structure which is formed by a thin, vertical, enclosure side wall. A flat, round, dividing cross wall is connected horizontally to the inner side of the side wall near the top end of the plant stand. The dividing cross wall is connected to divide and form a receptacle shallow tray on a top end and a deeper receptacle bowl on a bottom end of the plant stand.

The plant stand can be flipped upside down to turn a receptacle bowl up. A vertical, adjustable, cylindrical bracing post member is connected to a center of the dividing cross wall of the bowl. The vertical bracing post member can be adjusted to be equal or higher than the side wall of the bowl. The bracing post consist of the outer, higher, hollow, post which is fastened to connect with the inner, lower post. A bud connector is connected to the top center of the bracing post member for the connection with the center hole of the bottom wall of the plant stand. The plant stand can be made of a plastic material through a molding production process.

The plant container can be applied to contain and grow a house plant. The container can be set on the top of the shallow tray of the plant stand for decorating and for preventing water from the container to run onto a floor.

"The Planter Set" can be set to eject and remove the tight pot-bound roots of the plant from the plant container. For the application, the plant container must be rearranged to set on the top center of the bracing post of the receptacle bowl of the plant stand. Then the side wall of the plant container can be pressed downwardly against the bracing post until the bottom rim of the side wall reaches to the dividing cross wall of the bowl. As a result, the bottom wall of the plant container, the plant and its pot-bound roots will remain on the top of the bracing post. The plant, therefore, is ready for an easy removal to transfer to grow in a larger pot or can be left to stand on the top of the post for further soil treating or root caring work.

In the meantime, the receptacle bowl is constantly set to function as a trash bin in receiving and collecting any loose dirt, dust, cut roots, dead roots or other agents which may drop from the pot-bound roots during the removing, transferring, soil treating, or root caring work.

Objects of Invention (a) An object of the invention is for multiple usage of the plant container and the plant stand as a matching set for containing, growing and decorating a type of house plants; and can be convertibly set to eject the plant from the container and to set the plant in the open space for transplanting, soil treating or root caring work.

(b) An object of the removable part of the bottom wall of the container is for sliding and ejecting the plant and its pot-bound roots to be smoothly slid from the smaller bottom end to the larger top end of the plant container, while the plant is standing still in its original upright position at all times during the ejecting and setting means.

(c) An object of the receptacle plant stand is for multiple usage; wherein all or part of the plant stand can be applied integrally with the plant container to create the functional features of the multiple usage as of the following:

C-1. A shallow tray plant stand is for setting the plant container to stand for decorating and is for preventing water from running onto a floor.

C-2. A bracing post of the bowl side of the plant stand is for bracing against the bottom wall of the container during the ejecting and removing means.

C-3. The bracing post has another functional feature of a high supporting stand to support the bottom wall of the plant container, which is set as a base for the plant and its pot-bound roots to stand and expose the under soil parts of the plant in an open space for a convenient work or for further transferring.

C-4. A receptacle bowl of the plant stand is set as a trash bin for receiving and collecting any loose dirt, cut roots and dust, which may fall from the pot-bound roots, during the activities of the removing, soil treating, or root caring work.

(d) Another major object of the invention is to save time and energy of the user.

Remarks: None of the dotted lines PB (Pot-bound roots) and P (plant) of FIG. 4. is a part of this invention.

DETAILED DESCRIPTION OF INVENTION

Figure 1:
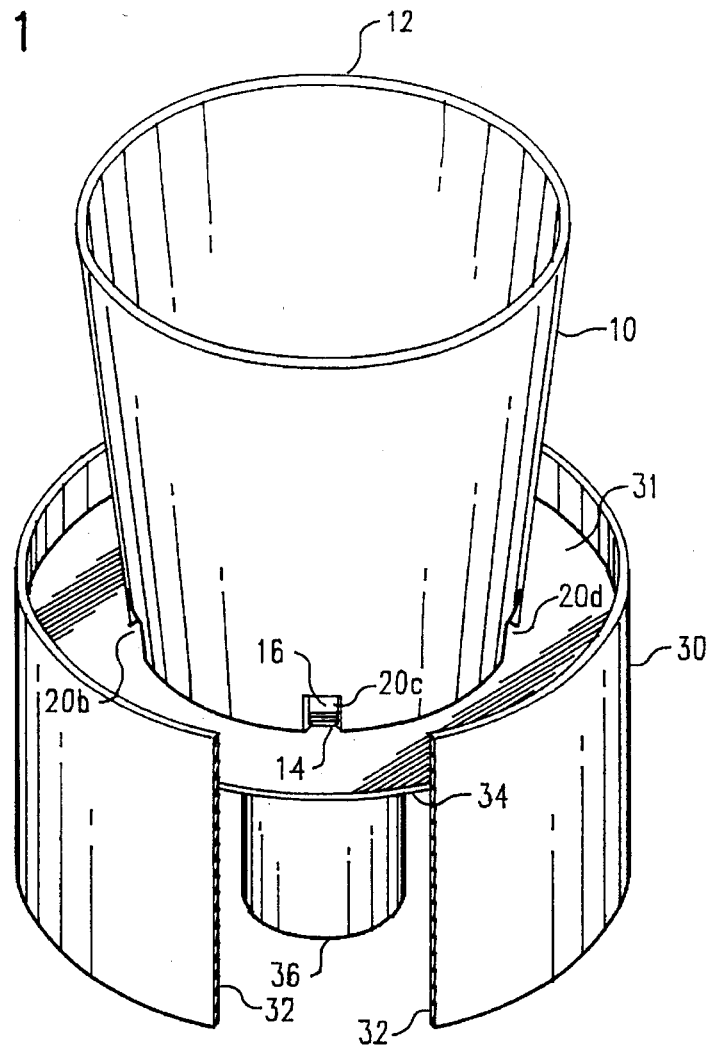
FIG. 1. shows a perspective top side view of a receptacle plant stand which has a plant container set on its shallow tray side and further shows a partial, sectional top side view of the dividing cross wall and bracing post of the plant stand.
Figure 3:
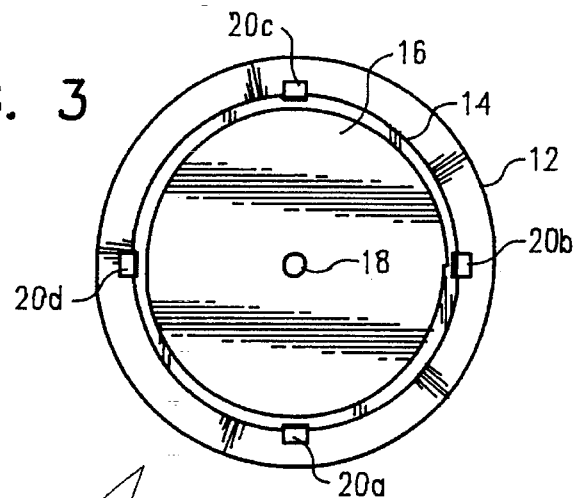
FIG. 3. shows a bottom plane view of the plant container.
Figure 4:
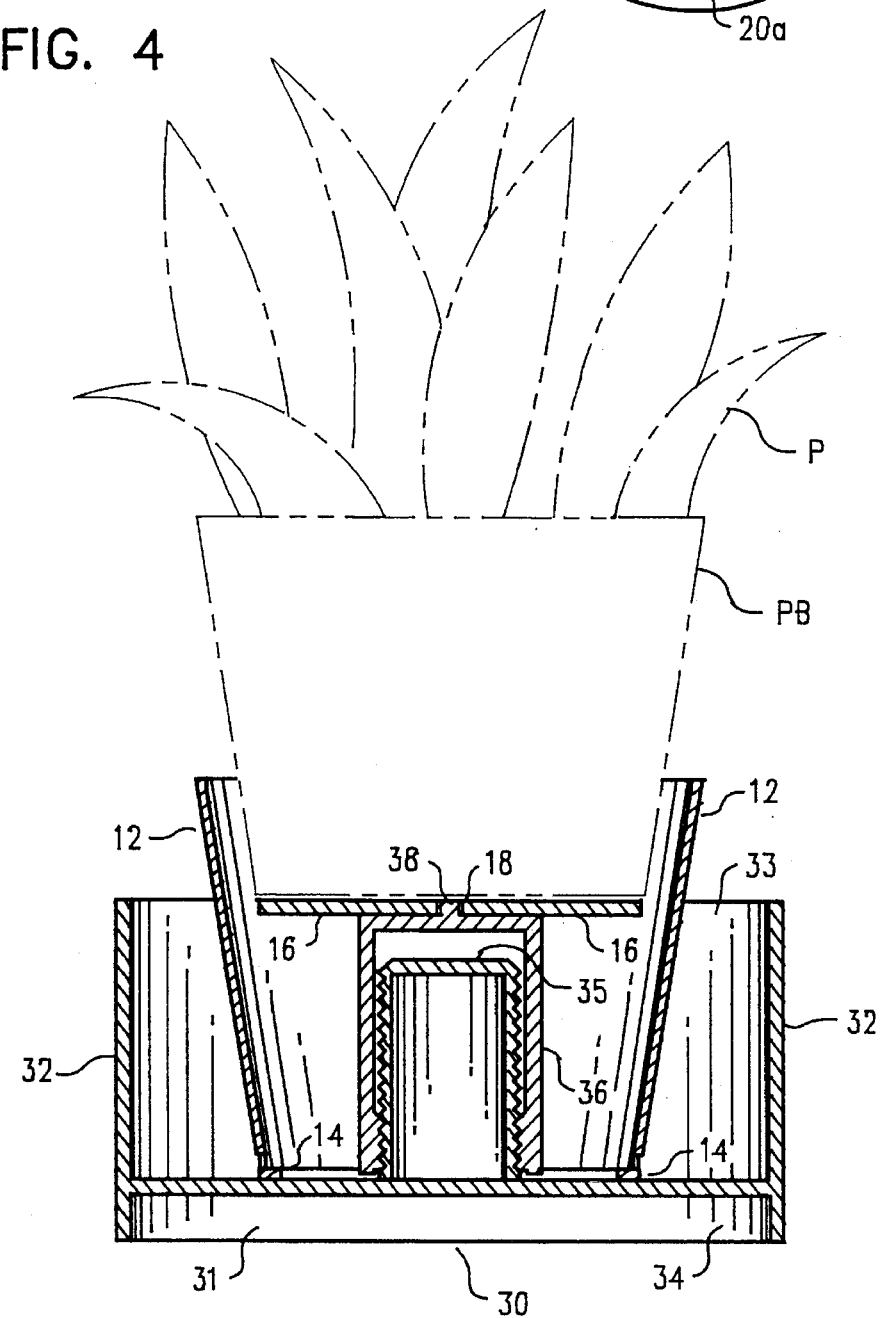
FIG. 4. shows a sectional plane side view the plant container and the plant stand on the position right after the enclosure side wall of the plant container is pushed to rest on the cross wall of the bowl of the plant stand; whereas the bottom wall along with the plant and its pot-bound roots are set openly on the top of the vertical post of the bowl for a convenient work to be performed.

FIG. 1. shows a plant container 10, which is set in a center of a shallow tray side of a receptacle plant stand 30. FIGS. 1, 3 and 4 show the plant container which has two major separated structures: a round, hollow, tapered-shaped, body structure of the container, which is formed by a thin, high, vertical enclosure side wall 12, and a separated, flat, round, horizontal, removable bottom wall 16.

The hollow, taper-shaped, body structure of the plant container has a larger circumference and larger opening on a top end and is gradually tapered down into a smaller circumference and smaller opening on a bottom end. A narrow, elongated, raised, support edge 14 is made to connect with the inner bottom border of the bottom end of the enclosure side wall 12 to surround the bottom opening of the container. Four bottom side drainage holes 20a, 20b, 20c and 20d are made just above the bottom edge 14 of the enclosure side wall. The water drainage holes are set at approximately 90 degrees apart from each other.

A flat, round, removable bottom wall 16 can be set horizontally on the support edge 14 to enclose the bottom end of the container. The bottom wall 16 of the plant container has a center hole 18 made for a connection. The two major structures of the plant container can be made of a plastic material through the molding production process.

Figure 2:
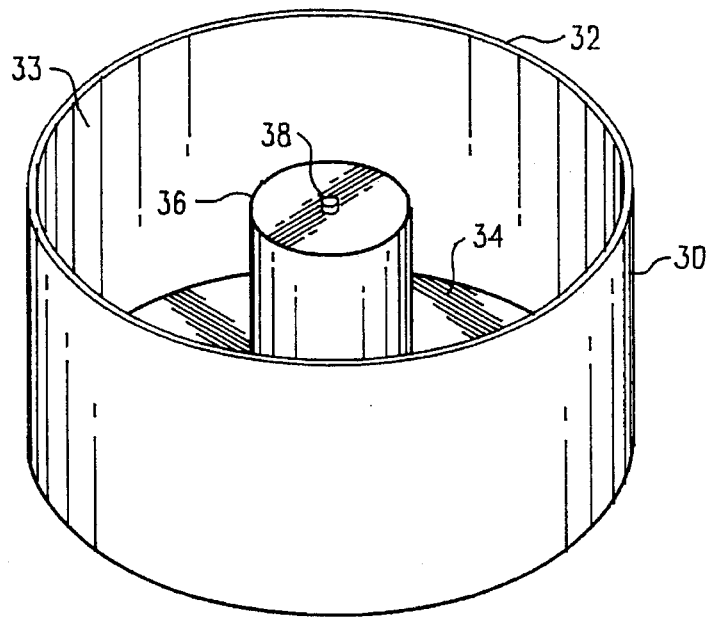
FIG. 2. shows a perspective top side view of a receptacle bowl side of the plant stand.

FIGS. 1, 2 and 4 show the matching vertical plant stand 30 of the plant container 10 which has a shallow receptacle tray 31 on one end and a deep receptacle bowl 33 on the other end. The plant stand body is a hollow, cylindrical block structure, which is formed by a thin, vertical, enclosure side wall 32. The cylinder-shaped structure of the plant stand is made to be larger than the plant container. The hollow opening is formed from a top end through a bottom end. A flat, round, dividing cross wall 34 is connected horizontally to an inner side of the side wall at a position closer to the top end of the plant stand. So that, the dividing cross wall divides the plant stand to be a shallow tray on the top end and a deeper bowl on the bottom end.

FIG. 2 shows that the plant stand can be flipped upside down to turn the receptacle bowl structure 33 up. At this position, a bracing post member is set vertically on a center of the cross wall of the bowl. The bracing post member consists of: a lower, smaller, hollow, inner, cylindrical threaded post 35, which is connected vertically to the center of the dividing cross wall 34; and a higher, larger, vertical, hollow, cylindrical post 36, which has a matching internal threaded section made on an inner, lower end, fastened to connect and cover the inner, lower post 35. The higher post 36 can be adjusted to be either equal or higher than the side wall of the bowl 33. A raised, cylinder-shaped, bud connector 38 is made on the top center of the post 36. The bud connector 38 is made to connect to the center hole 18 of the bottom wall of the container as shown on FIG. 4. The plant stand can be made of a plastic material through a molding production process.

For the application, the plant container 10 can be applied to contain a type of house plants and soil for growing. The plant container can be set on the receptacle tray side of the plant stand for decorating and for preventing water from the plant container to run onto a floor.

After a period of time, the plant may have to be removed or transplanted to a larger pot or to be set for soil treating or root caring works. Therefore, the receptacle bowl side of the plant stand can be set as shown on FIG. 2. FIG. 4 shows that the plant container can be set on the top center of the vertical bracing post member of the receptacle bowl of the plant stand. The center hole 18 of the bottom wall 16 of the container is aligned to fit and cover the bud connector 38 of the bracing post 36. The connection is for securing and centralizing the bottom wall. Then, the top rim of the side wall of the plant container can be pressed downwardly until the bottom rim of the side wall of the plant container rests on the dividing cross wall 34 of the bowl. The bottom wall 16, the plant P and its pot-bound roots PB, therefore, are freed from the confinement of the side wall of the container. Besides, the plant is readily set on its original upright position on the top center of the bracing post 36. On this position, the plant can be easily removed to transplant into another larger pot. Or the plant can be left to stand and expose its pot-bound roots in an open space on the top of the bracing post. This setting of the plant is for other necessary works, such as: root separating, soil treating, or root trimming.

In the meantime, the receptacle bowl of the plant stand is constantly set to function as a trash bin for receiving and collecting any loose dirt, cut roots, dead roots, dust, and other agents, which may drop from the pot-bound roots, during the activities of removing, soil treating or root caring work.

Although the description above contains a full and complete disclosure of this invention, these should not be construed as limiting the scope of the invention but as merely providing the preferred embodiment of the invention. The various modifications and alternates may be further employed without departing from the scope and spirit of this invention. For example, the shape of the plant container and its matching stand can be made to form into the square, hexagon, octagon or other shaping block. Each of them may require to have one connecting wall or plurality of vertical walls to be connected together. Other rigid materials, such as metal, wood, or ceramic, can be used to substitute a plastic material in the production of this invention. Therefore, the scope and spirit of the invention should be determined by the appended claims and their legal equivalents.

I claim:

1. A set of a plant container and a plant stand for containing, growing and decorating a house plant, said plant stand adapted to display said plant in it's container or eject said plant from it's container for transplanting, soil treating, or root caring work, said set comprising:

(a) a plant container member having a top end and a bottom end opening;
   (b) a flat, rigid, removable bottom wall being set to enclose said bottom end of said plant container;
   (c) a plant stand and ejector device including at least one rigid, thin, vertical enclosure side wall forming a hollow body said hollow body being larger than said plant container, said plant stand having a top end and a bottom end;
   (d) a rigid, flat, dividing cross wall connected horizontally to an inner side of said vertical enclosure side wall of said plant stand to form a shallow tray structure on said top end and to form a deeper bowl structure on said bottom end of said plant stand; and
   (e) a rigid bracing post member connected vertically to a center of said dividing cross wall of said bowl of said plant stand and useable as a root ball ejector means, whereby said plant container can be set on said shallow side of said plant stand for decorating or on said deep bowl side of said plant stand for root working.

2. The invention of claim 1 wherein said bracing post has an adjustment means for adjusting it's length.

3. The invention of claim 2 wherein said adjustment means comprises:

(a) an elongated, round, inner, lower, vertical post, which having an external threaded body for a fastening connection, connected vertically to said center of said dividing cross wall of said bowl;
   (b) an outer, higher, larger, hollow, cylinder-shaped post, which having a matching internal threaded section made on its inner, lower end, wherein said higher post can be fastened to connect to said lower vertical post;
   (c) whereby said higher post can be adjusted to be equal or higher than said side wall of said bowl of said plant stand member.

4. A receptacle plant stand water tray for an application with a matching plant container of the type which having a removable bottom wall, wherein said plant stand can be set to contain said plant container for decoration or for ejecting said removable bottom wall of said plant container, wherein said plant stand comprises:

(a) a main hollow, body structure block which having at least one, thin vertical enclosure side wall, wherein said hollow body structure having a first end and a second end;
   (b) a rigid, flat, dividing cross wall connected horizontally to an inner side of said vertical, enclosure side wall of said plant stand to form a shallow tray structure on said first end and to form a deeper bowl structure on said second end of said plant stand;
   (c) a rigid bracing post member connected vertically to a center of said dividing cross wall of said second end of said plant stand;
   (d) whereby said plant container can be set on said shallow side of said plant stand for decorating or on said deep bowl side of said plant stand for root working means.

5. The invention of claim 4 wherein said bracing post has an adjustment means for adjusting it's length.

6. A receptacle plant stand water tray for an application with a matching plant container of the type which having a removable bottom wall, wherein said plant stand comprises:

(a) a main hollow, body structure block which having at least one, thin vertical enclosure side wall and a flat, cross wall connected together for containing said plant container and any dipping water from said plant container;
   (b) a rigid bracing post member connected vertically to a center of said cross wall of said plant stand;
   (c) said bracing post member further having an adjustment means for adjusting it's length;
   (d) whereby said bracing post can be adjusted to set for a desire height, and said plant container can be set on said bracing post, so that said plant container can be pressed downwardly for ejecting said removable bottom wall upwardly.

* * * * *